April 14, 1942. C. L. HOLM 2,279,400
MOTOR VEHICLE TURN INDICATOR
Filed Jan. 11, 1940 2 Sheets-Sheet 1
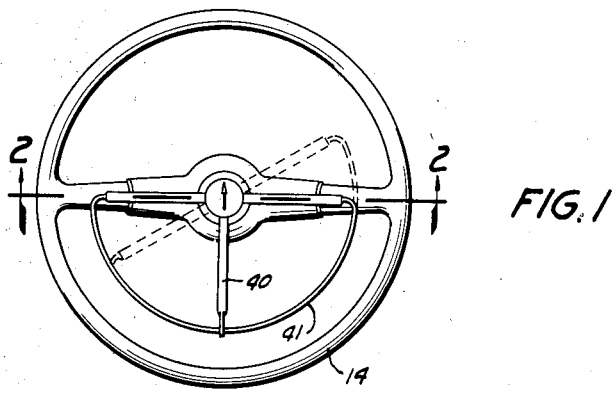
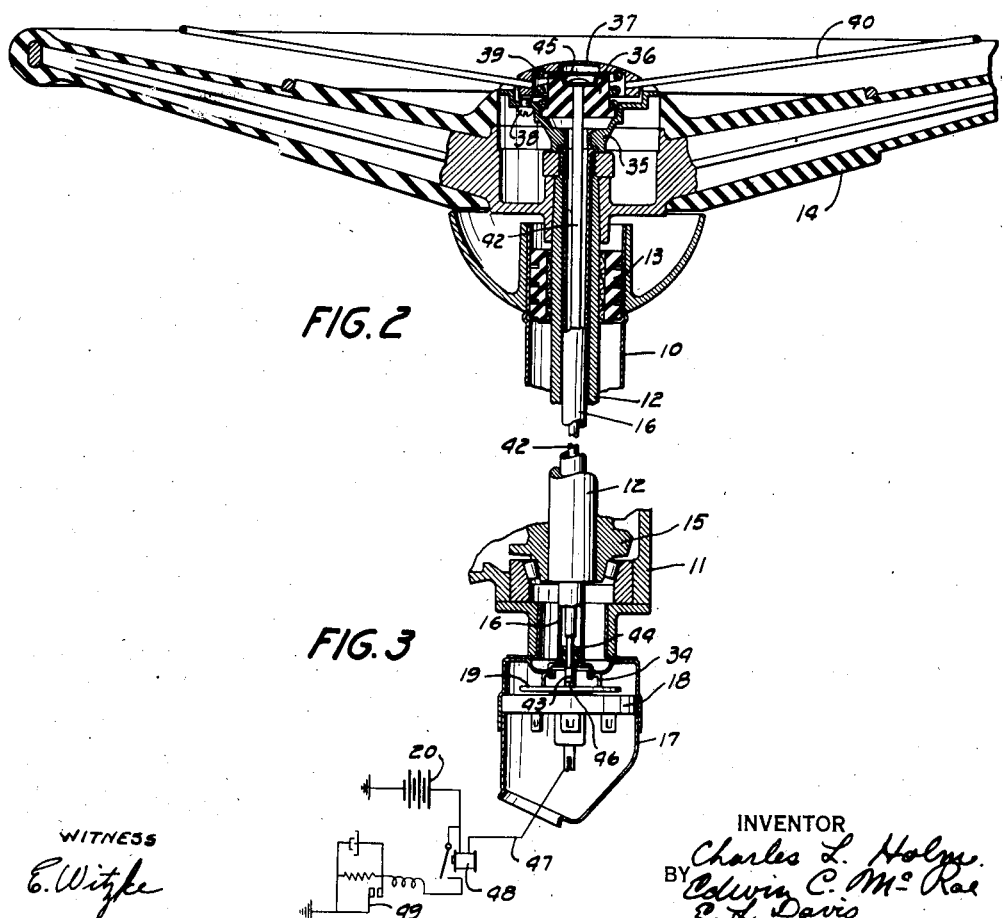
WITNESS
E. Witzke
INVENTOR
Charles L. Holm.
BY Edwin C. McRae
L. L. Davis
ATTORNEYS.

April 14, 1942.  C. L. HOLM  2,279,400
MOTOR VEHICLE TURN INDICATOR
Filed Jan. 11, 1940  2 Sheets-Sheet 2

WITNESS
E. Witzke

INVENTOR
Charles L. Holm
BY Edwin C. McRae
E. L. Davis
ATTORNEYS

Patented Apr. 14, 1942

2,279,400

UNITED STATES PATENT OFFICE 2,279,400

MOTOR VEHICLE TURN INDICATOR

Charles L. Holm, Dearborn, Mich., assignor to Ford Motor Company, Dearborn, Mich., a corporation of Delaware Application January 11, 1940, Serial No. 313,368

1 Claim. (Cl. 200—59)

The object of my invention is to provide a turn indicator for motor vehicles whereby the driver of the vehicle may conveniently signal his intention to turn to drivers who may be approaching both from the front and from the rear.

The invention described herein relates to the control mechanism by means of which the driver controls the turn indicator the particular feature claimed being a spider member which is mounted upon the steering wheel and which may be oscillated either clockwise or counterclockwise to operate the light switch mechanism. This spider member is believed to be unique in that it may be pressed in a direction transverse to its direction of oscillation so as to sound the vehicle horn.

In the past one of the objections to the use of turn indicators on automobiles has been that there was no convenient place to install the control mechanism. The center of the steering wheel was invariably taken up by the horn switch, which in many cases comprised a circular ring almost as large in diameter as the steering wheel. It was commercially impractical to mount a turn-indicator switch on the steering wheel because of the presence of the horn ring. Experience has shown that unless the switch is mounted in a very convenient place, the driver will not bother to use the indicator. Consequently, it is highly desirable that the indicator switch be placed close to the operator's hand.

With my improved construction, a single control ring is provided which, when any portion therearound is pressed, will sound the horn and which, when oscillated in either direction, controls turn indicator lights at the front and rear of the car.

Although I have shown and described the indicator lights and switch mechanism employed, it will be understood that the turn indicator switch proper is not claimed to be my invention, and that my invention is based upon the novel operating ring which may be operated to sound the horn and selectively or simultaneously control the indicator lights.

With these and other objects in view, my invention consists in the arrangement, construction and combination of the various parts of my improved device, as described in this specification, claimed in my claim, and illustrated in the accompanying drawings, in which:

Figure 1 is a plan view of a motor vehicle steering wheel having my improved control mechanism installed thereon.

Figure 2 is a sectional view taken upon the line 2—2 of Figure 1.

Figure 3 is a sectional view through the lower end of the steering column, which supports the wheel shown in Figure 2; this view also diagrammatically illustrating the electrical connections to the horn of the vehicle.

Figure 4:
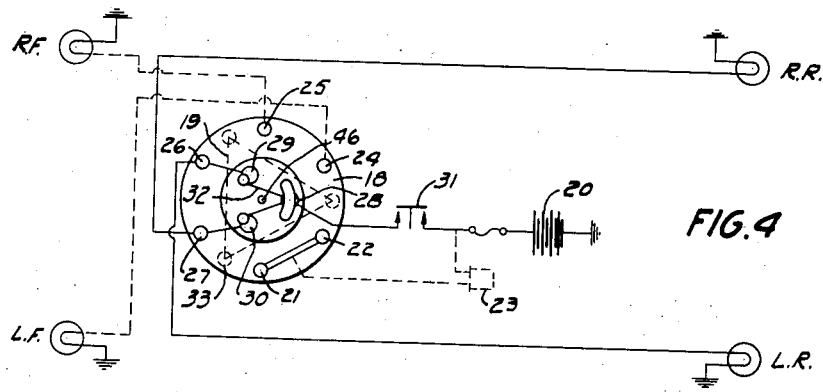
Figure 4 is a wiring diagram of the turn-indicator circuit showing the indicator switch in a neutral position.

Referring to Figures 1 and 2 of the drawings, I have used the reference numeral 10 to indicate a conventional steering column which extends from the vehicle frame up through the floor boards just in front of the driver. The lower end of the column 10 is provided with a steering gear housing 11, which housing is fastened to the vehicle frame and supports the column thereby. A steering gear shaft 12 is rotatably mounted within the steering column 10 and extends from the upper end thereof down into the housing 11, where it is secured to a steering gear worm 15 in the conventional manner. The upper end of the shaft 12 is mounted in a resilient bearing 13, which is supported by the upper end of the column 10. A two-spoke steering wheel 14 is secured to the upper end of the shaft 12, so that rotation of the wheel 14 rotates the steering gear worm 15.

It will be noted that both the shaft 12 and worm 15 are provided with axial bores therethrough in which a tube 16 extends. The upper end of the tube 16 projects upwardly beyond the upper end of the shaft 12, while the lower end projects downwardly through the worm 15.

A turn indicator switch housing 17 is detachably secured to the lower end of the housing 11 and is adapted to house a turn-indicator switch therein. This switch comprises a stationary switch plate 18 formed of insulating material having a plurality of terminals mounted therein. These terminals are arranged in two concentric annuli the outer annulus being composed of six equally spaced terminals and the inner annulus of three terminals. An outer switch member 19 is rotatably mounted within the housing 17 and is provided with three contacts thereon which coact with the terminals of the outer annulus to produce in each of three positions, as will presently be described, the various circuits necessary to establish the indicating signals. An inner switch member 32 is resiliently mounted upon the member 19 and contacts the three inner terminals.

The system of indicating used herein comprises flashing a light of about twenty-one candlepower at both front and rear of the side of the vehicle corresponding to the direction towards which the turn is to be made. The switch mechanism must be so constructed that when it is in a neutral position the brake pedal may be depressed to operate a stop light. In this system both rear indicator lights are continuously illuminated to indicate that the driver is stopping the car. However, when it is desired to make a right turn the driver moves the control mechanism clockwise, whereupon the front and rear lights at the right-hand side of the car flash on and off at about one-half second intervals. If a left-hand turn is desired, the control mechanism is moved counterclockwise, at which time the left-hand front and rear lights flash. If, while the turn indicator is moved to either left or right positions it is desired to stop the car, then actuation of the brake pedal will continuously illuminate whichever rear light is not being flashed by the turn-indicating system. In this way, the person approaching from the front may ascertain the direction in which the driver intends to turn and the driver approaching in the rear may likewise ascertain the direction in which the driver intends to turn and whether or not he is applying the brakes of his car.

Figure 5:
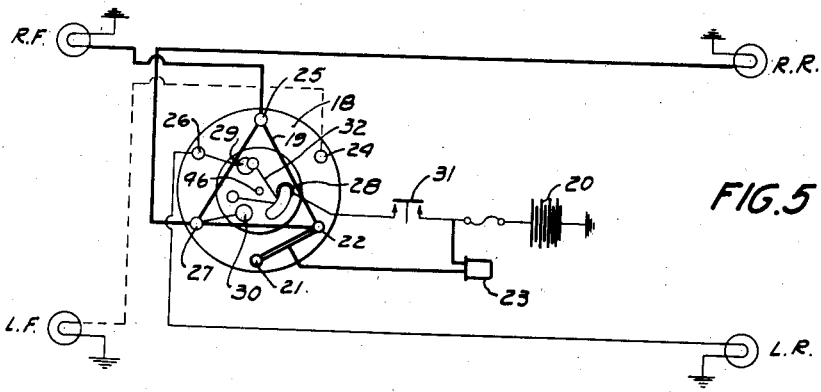
Figure 5 is a wiring diagram of the indicating circuit, the indicator switch being in a position to signal a right turn and, Figure 6 is a wiring diagram of the indicator circuit, the indicator switch being in a position to indicate a left turn.
Figure 6:
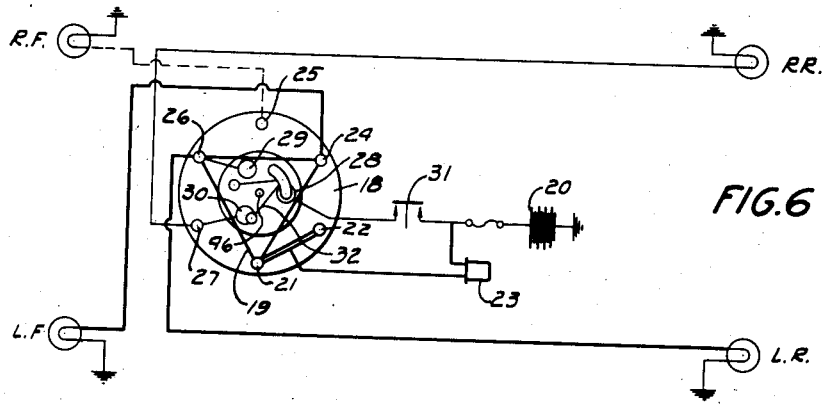

The operation of the switch mechanism may be better understood by referring to the wiring diagrams in Figures 4, 5 and 6. In each of these views, the car battery is given the reference numeral 20. A flasher switch 23 is connected to the battery and a pair of adjacent terminals 21 and 22 on the outer annulus are connected together and to the flasher switch. The flasher mechanism may comprise any one of a number of different devices which are usually arranged to operate thermostatically to make and to break a circuit therethrough at about one-half second intervals.

The four lights on the respective corners of the car have not been given identifying numerals but have been marked with abbreviations: RR for right rear, LR for left rear, RF for right front and LF for left front. These lights are preferably double filament lamp bulbs, the filaments being 21 and 3 candlepower, respectively. The 21-candlepower filaments are used as the turn-indicator filaments, while the 3-candlepower filaments on the front lights are used as parking lights and the 3-candlepower filaments on the rear lights are used as taillights. The 3-candlepower filaments are connected in a separate lighting circuit, and have not been illustrated herein as they in no way interact with the turn-indicator circuit.

Terminals 24 and 25 on the plate 18 are connected, respectively, to the left-front and right-front indicator lights, while terminals 26 and 27 are connected, respectively, to the left-rear and right-rear indicator lights. One of the three inner terminals 28 on the inner annulus is connected to a stop-light switch 31, while the other two terminals 29 and 30 are connected to terminals 26 and 27, respectively.

The switch member 19 comprises a metallic ring having three detents projecting downwardly therefrom, the detents being equally spaced therearound. Thus, each alternate terminal of the outer annulus may be connected together.

In the several wiring diagrams this connecting ring is shown as a triangle and has been given the reference numeral 19. The inner contact member 32 is adapted to oscillate over the terminals 28, 29 and 30 in synchronism with the member 19 but the member 32 is not electrically connected to the member 19.

Referring to Figure 4 of the drawings, it will be noted that three depressions 33 are provided in the insulated part of the plate 18, which depressions are equally spaced around the periphery of the plate 18. The detents on the switch member 19 are resiliently urged into these depressions to hold the member 19 in its neutral position. In this position the member 19 contacts none of the terminals on the plate 18. However, when the switch is in neutral the inner contact member 32 connects all three inner terminals 28, 29 and 30 together.

Figure 4 shows the switch in its neutral position, from which it will be seen that the flasher terminals 21 and 22 are not connected with any of the other terminals so that none of the indicator lights are being flashed. However, the stop light terminal 28 is connected to both terminals 26 and 27 so that both of the rear lights will be continuously illuminated when the stop-light switch 31 is closed.

If now the member 19 is rotated clockwise to the position shown in Figure 5, then the terminals 22, 25 and 27 will be connected together by the outer ring, while the inner contact member 32 connects the terminal 28 with terminal 29. When this occurs the front-right and front-rear lights will be energized through the flasher mechanism 23, as shown by the heavy lines in Figure 5. If now the stop-light switch is closed, only the left-rear light will be continuously illuminated.

Referring to Figure 6, it will be noted that when the member 19 is rotated counterclockwise from its neutral position, the terminals 21, 24 and 26 will be connected together by the outer ring, while the inner contact member 32 connects the terminals 28 and 30. In this position only the left-front and left-rear lights will be intermittently operated through the flasher 23 so that if the stop-light switch is closed, only the right-rear light will be continuously operated.

From the foregoing it would seem that to operate the turn-indicating mechanism it is only necessary to move the switch members 19 and 32 clockwise or counterclockwise 30° from a neutral position. To accomplish this, I extend the tube 16 downwardly through the lower end of the steering gear housing 11 and provide a fork 34 thereon which fits into suitable slots in the member 19 so that rotation of the tube 16 rotates the contacting members 19 and 32 therewith.

A hub member 35 is fitted to the upper end of the tube 16, which hub member is grounded to the frame of the car through the steering shaft 12. A block of insulating material 36 is fitted into the central portion of the hub 35 and a plate 37 is disposed over the outer end of the block 36. Three screws 38 are threaded through suitable openings in the hub 35 and into the plate 37, these screws being equally spaced around the periphery of the hub 35. A compression spring 39 is interposed between the plate 37 and the hub 35. The heads of the three screws 38 limit the movement of the plate 37 by the spring 39.

A terminal disc 45 is secured to the upper end of the block 36 in such position that it is normally spaced a small distance from the plate 37.

However, should the plate 37 be pressed downwardly against the resistance of the spring 39, then it will contact the disc 45. In like manner, should any peripheral portion of the plate 37 be pressed downwardly, as would occur if the plate were rocked, this will cause the plate to pivot around one of the screws 38 and thereby contact the disc 45. The contact of the disc 45 with the plate 37 completes the horn circuit of the vehicle to thereby blow the vehicle horn.

In order to conveniently rock the plate 37, I have provided three arms 40 which are cast integrally with the plate and which extend radially therefrom at 90° intervals. The outer ends of the arms 40 are connected by a ring 41 to form an operating spider. When any portion of the ring 41 is pressed toward the steering wheel or pulled away from the wheel, the plate member 37 is rocked to thereby ground the disc 45.

A horn wire 42 extends downwardly from the disc 45, to which it is connected through the block 36 and tube 16, where it is secured to a terminal 43 in an insulating sleeve 44 at the lower end of the tube 16. The terminal 43 is resiliently urged into contact with a central terminal 46 in the member 18 so as to be permanently in contact therewith. A wire 47 extends from the terminal 46 to a vehicle horn relay 48, the other terminal of the relay extending to the car battery 20. The relay 48 is arranged to complete an electrical circuit through a horn 49 in the conventional manner.

From the foregoing it will be seen that pressure upon the ring 41 at any point around its periphery will ground the horn wire 42 through the plate 37 to thereby complete the horn circuit. Furthermore, if the ring 41 is oscillated, then the turn-indicator lights at the respective sides of the car will flash to indicate an intention to turn.

The most important advantage arising from the use of my improved construction is that a single control is provided which, when pressed toward the steering wheel, will sound the horn of the vehicle and which may be oscillated in either direction to operate the turn-indicator lights.

Some changes may be made in the arrangement, construction and combination of the various parts of my improved construction without departing from the spirit of my invention and it is my intention to cover by my claim such changes as may reasonably be included within the scope thereof.

I claim as my invention:

In a vehicle steering mechanism, in combination, a fixed tubular member and a rotatable tubular member therein, constituting a steering column and steering shaft, respectively, a steering gear housing disposed at the lower end of said column, a steering wheel attached to the upper end and a steering gear attached to the lower end of said shaft, a second tubular member rotatably mounted within said shaft constituting a signal tube, said column, shaft and signal tube being substantially coaxial, a hub secured to the upper end of said signal tube and adapted to rotate therewith, said signal tube extending downwardly through said steering shaft and said steering gear, a movable switch plate secured to the lower end of said signal tube, a fixed switch plate secured to said gear housing co-operating with said movable switch plate, a resilient detent and recess means operable between said switch plates, whereby said movable switch plate and signal tube are resiliently urged to remain at any one of a plurality of selective positions, a horn spider plate rockably mounted on said hub to rotate therewith, a semicircular spider secured to said horn spider plate, an electrical contact carried by said hub, co-operating contact means on said horn spider plate, spring means normally urging said contact means apart, the rotational movement of said signal tube being independent of the rotation of said shaft, whereby on rotation of said spider said switch may be selectively operated as a part of a turn indicator circuit, and on rocking of said spider the vehicle horn may be energized.

CHARLES L. HOLM.